Figure 1:
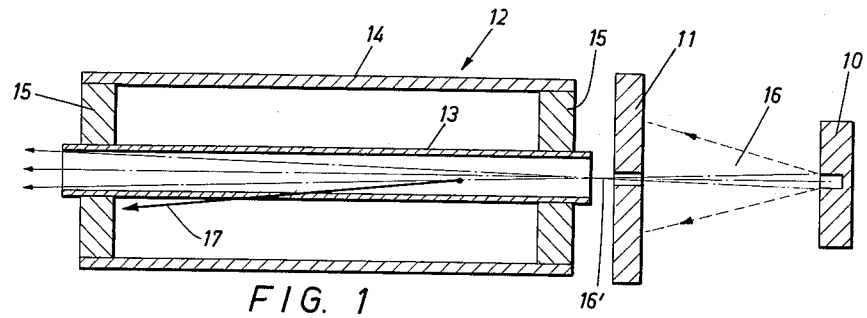

Sept. 21, 1965 W. W. B. SCHUMACHER 3,207,895
METHOD FOR MEASURING LOW DENSITY ATMOSPHERES
Filed April 5, 1961 3 Sheets-Sheet 1

Inventor
WILHELM W. B. SCHUMACHER
by: Harold G. Fox
Attorney 3,207,895
Patented Sept. 21, 1965

3,207,895
METHOD FOR MEASURING LOW DENSITY ATMOSPHERES
Wilhelm W. B. Schumacher, Toronto, Ontario, Canada, assignor to Ontario Research Foundation, Toronto, Ontario, Canada
Filed Apr. 5, 1961, Ser. No. 100,835
7 Claims. (Cl. 250—43.5)

This invention relates to methods and apparatus for measuring certain parameters of atmospheres, specifically the densities thereof. More particularly, this invention relates to methods and apparatus for measuring the density of the earth's atmosphere, for example, at high altitudes.

While my invention will be hereinafter mainly described in connection with its use as means for measuring the density of the earth's atmosphere at high altitudes, it will be appreciated that methods and apparatus embodying my invention may be employed in measuring other low density atmospheres.

The need for apparatus embodying my invention is quite apparent from item 966 in the publication entitled "Inventions Wanted by the Armed Forces," distributed by the National Inventors Council, U.S. Department of Commerce, item 966 being a so-called altimeter indicating pressure altitudes up to 500,000 feet or higher.

At high altitudes the mechanical barometer type of altimeter fails because of the low pressures encountered ($10^{-6}$ mm. of mercury at 500,000 feet). In principle any vacuum gauge may be used instead, but only under stationary conditions. With appreciable flow of gas present, any of the gauges based on heat conduction will be falsified by forced convection, and any of the gauges based on ionization will be falsified due to extraction of ions by the flow. Enclosing these gauges in a "gauge bulb" can usually not be tolerated because of such problems as slower response, outgassing and aerodynamic correction factors.

Altimeters can be built to measure altitude in terms of gas density, these altimeters utilizing particle beams from radio-active isotopes and their interaction with the gas. In principle any type of interaction may be used, but, as will become apparent, not every interaction will work under all conditions for various practical reasons.

Gauges based on the excitation of fluorescence require particle beams of much higher current than is practical with isotope sources. In addition, these types of gauges, generally require the use of heavy and bulky auxiliary equipment. At the present time rockets or satellites can carry only limited weights and sizes of equipment. This latter consideration practically rules out the use of fluorescence type gauges.

Gauges based on beam attenuation or energy loss or back-scattering require paths of undue length if very low gas densities are to be measured. This is the case even if low energy particles are employed, like beta particles from Ni–63 (68 kev.) or H–3 (18 kev.). For example, it can be shown that an attenuation type gauge operating in air with a density of $1.6 \times 10^{-9}$ gm./cm.$^3$ (altitude of 500,000 feet), and employing a Ni–63 source, requires a path length of about 6 km. At an altitude of 300,000 feet (density $1.6 \times 10^{-6}$ km./cm.$^3$) a path length of about 6 m. is necessary. In addition, gauges based on beam attenuation are subject to electrostatic and magnetic disturbances. The practical lower limit for the use of attenuation type gauges to measure gas density is at the pressure level of about $10^{-3}$ mm. of mercury. While this lower limit could be extended, this would require either very long path lengths between source and detector, as aforementioned, or the use of very low energy particles. Since there are no isotope sources available giving electrons in the 10 kev. range, one would be required to use a heavy and complex electron gun, rather than a simple isotope source.

It is therefore an object of my invention to provide methods and apparatus for measuring the density of low density atmospheres, the methods and apparatus of my invention being based on the principle of detecting single scattered charged particles.

One essential difference between apparatus embodying my invention and a back scatter type gauge is that with the former I detect only single scattered particles which are scattered at an acute forward angle relative to the direction of travel of the beam of charged particles from the source. On the other hand, with the latter, the particles which are detected are those few number of particles which have been scattered backwardly relative to the direction of travel of the beam as a result of not one, but numerous collisions. Some of the reasons why back scattering type gauges are impractical for measuring low densities have been mentioned previously and need not be reiterated here.

Single scatter systems have been built with electron optical systems under dark field conditions. Such systems comprise a thermionic electron gun as a source of charged particles, an aperture through which the beam of particles is directed, a magnetic focusing system, a beam interceptor and a photographic plate. Gas of relatively high density is passed through an observation area of limited size, the remainder of the system operating under a very high vacum. The beam of charged particles passes thorugh the vacuum and impinges on the high density gas. Particles scattered by the gas are deflected by the magnetic field past the beam interceptor and are focused on the photographic plate. The essential difference between such a system and apparatus embodying my invention is that, with the latter, the beam of particles travels along a path through an atmosphere of at least substantially uniform density. On the other hand, with the former, the beam passes from a region of vacuum to a region of high density. Such a system as aforementioned is not practical for measuring low gas densities in the atmosphere.

It is another object of my invention to provide methods and apparatus for measuring low gas densities which are unaffected by flow of gas and which also operate equally well under stationary conditions. In this regard it should be noted that gas density gauges using fast charged particles are not affected by even super-sonic flow of gas thereby, the particles travelling with nearly the speed of light, compared with which the speed of the gas molecules is negligible.

A further object of my invention is to provide methods and apparatus for measuring low gas densities which are characterized by fast response and high sensitivity.

Yet another object of my invention is to provide low gas density measuring apparatus which is relatively small in size and light in weight.

In brief, one embodiment of a method of my invention for measuring the density of low density atmospheres comprises, directing a beam of charged particles along a path through an atmosphere of at least substantially uniform density from a source at least generally towards a detector and beyond a beam observation area. Unscattered ones of charged beam particles are prevented from being detected by the detector. Single scattered particles scattered from the beam at the beam observation area at an acute forward angle relative to the direction of travel of the beam are detected and counted by the detector. The number of particles so counted is related to atmospheric density.

Figure 2:
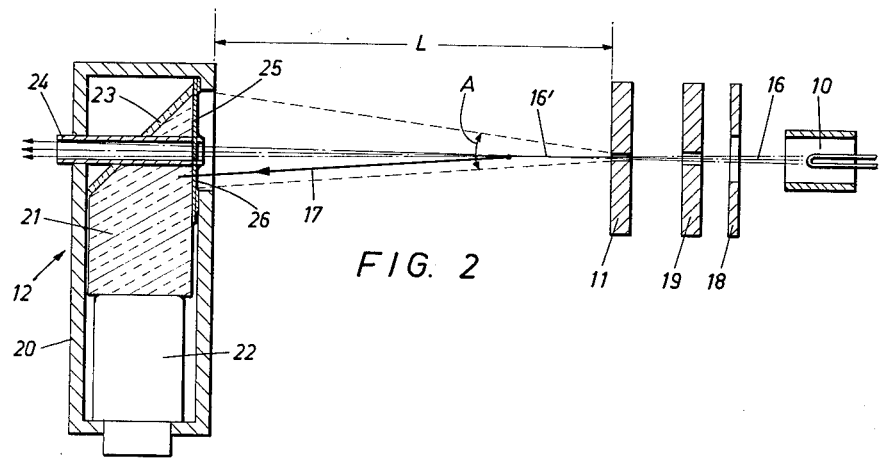
Figure 3:
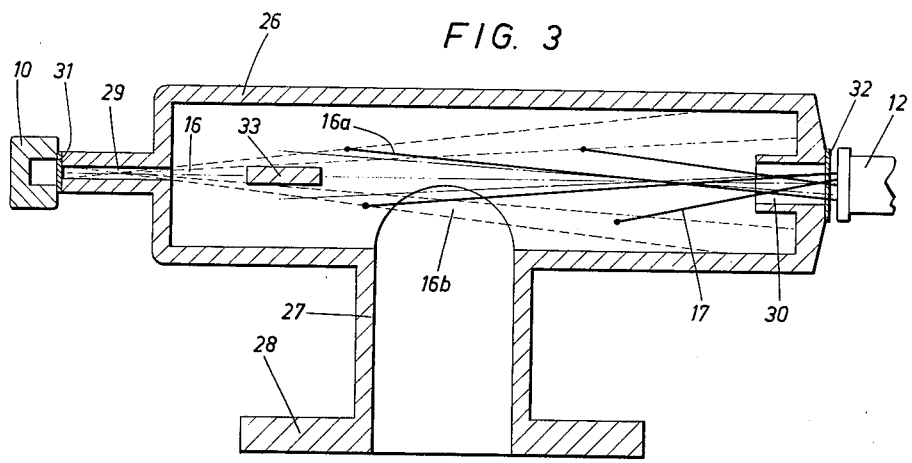
Figure 4:
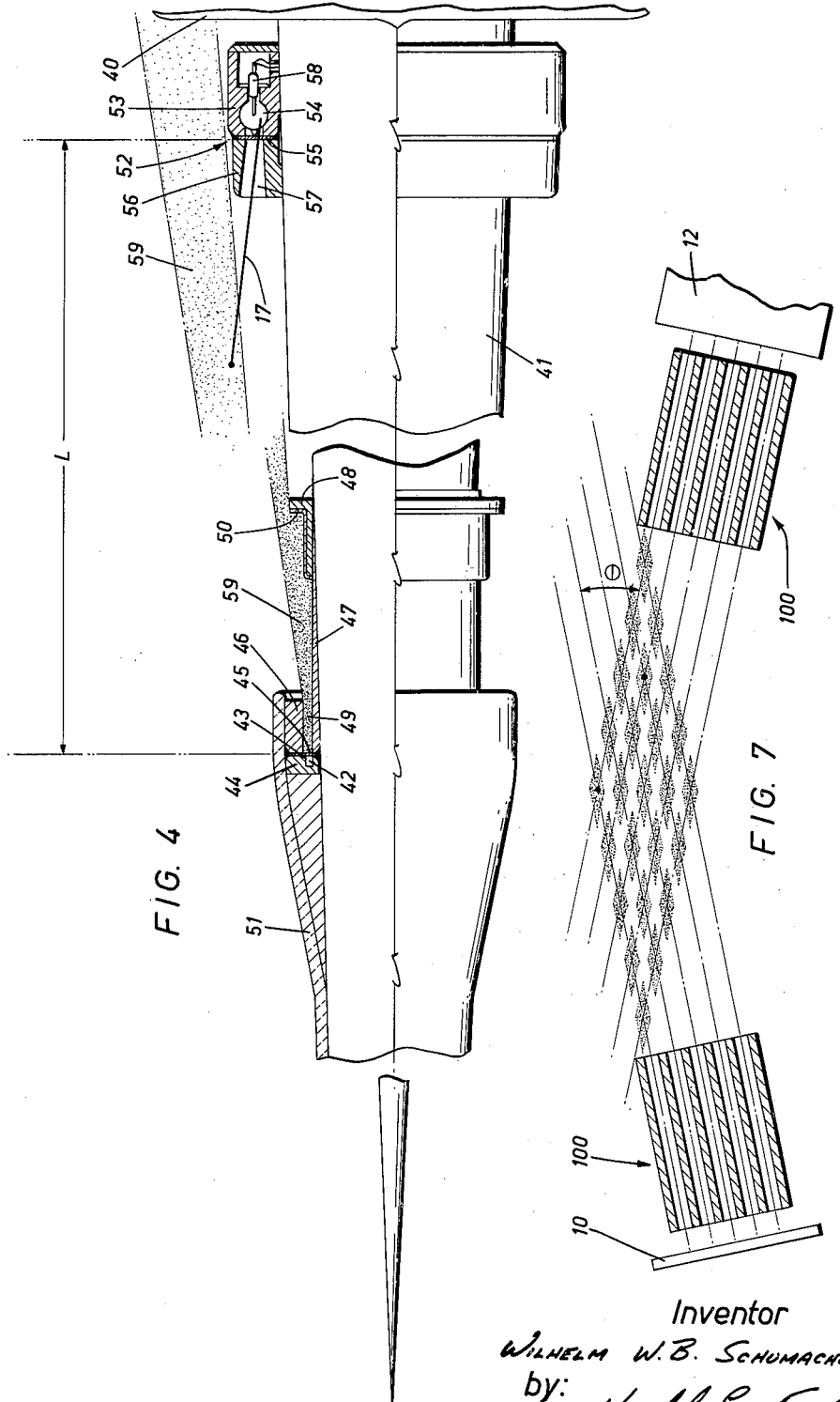
Figure 5:
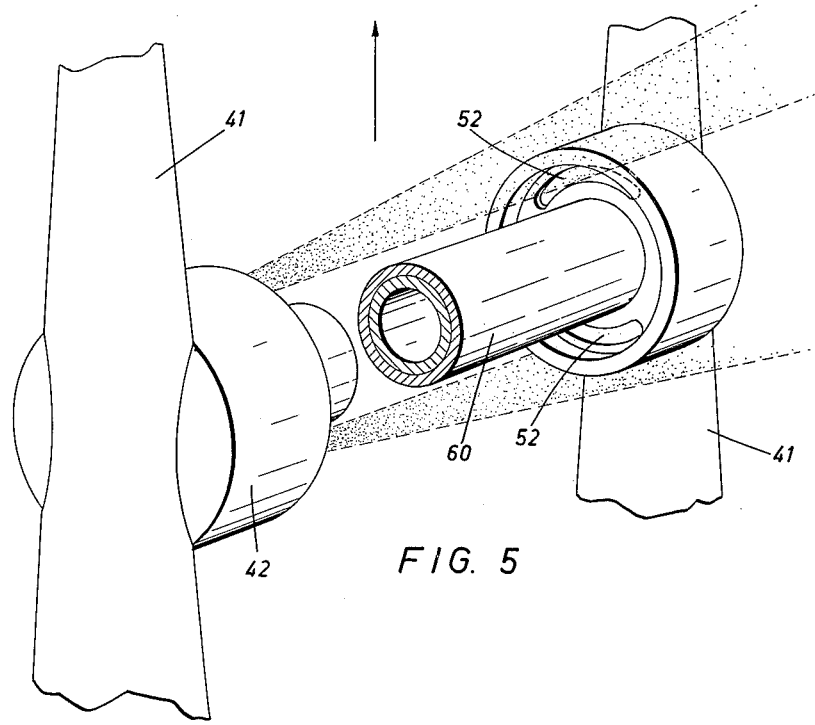
Figure 6:
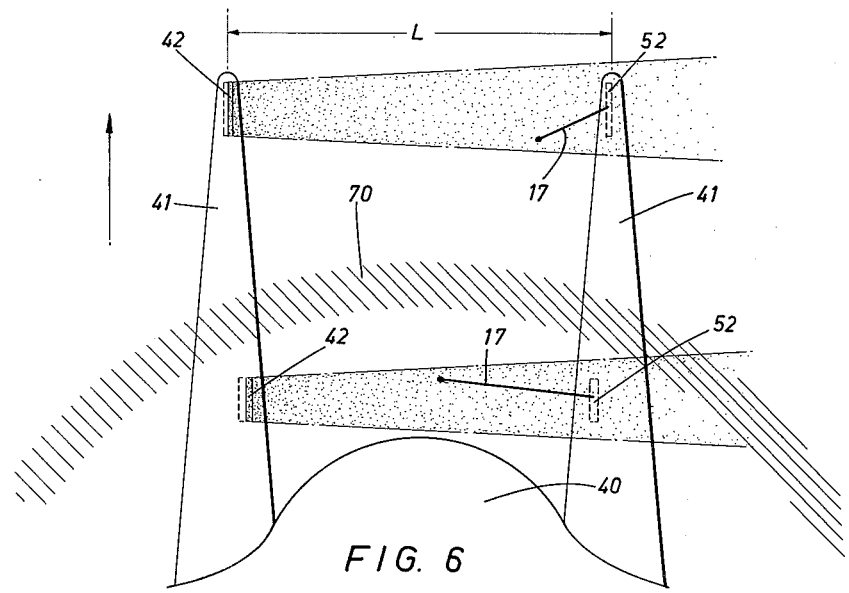

Numerous other objects and advantages of apparatus embodying my invention will become apparent from the following disclosure, taken in conjunction with the drawings, in which, FIGURE 1 illustrates schematically one embodiment of my invention, FIGURES 2 and 3 are other schematic illustrations of other embodiments of my invention, FIGURE 4 shows an embodiment of my invention which may be used with high flying vehicles such as rockets and satellites, FIGURE 5 is an embodiment of my invention which may be used to gauge mach numbers as well as gas densities, FIGURE 6 is an alternative embodiment of the apparatus illustrated in FIGURE 5, and FIGURE 7 shows an alternative embodiment of my invention useful not only for measuring the density of atmospheres but also for measuring the gas composition thereof.

Referring now to FIGURE 1 for a more detailed description of one embodiment of my invention, I have shown a point source 10 of charged particles (beta or alpha particles). This point source is preferably an isotope source, but may be an electron gun. Positioned in front of source 10 is a pin-hole aperture plate 11. One or more such plates may be provided, the apertures therein all being aligned with one another. Positioned in front of plate 11 is a detector 12 which, in the embodiment shown, is of the Geiger-Mueller type and comprises a thin walled tube 13, an outer tube 14 and electrically insulating end pieces 15. The space between the tubes is filled with a gas. Tube 13 and tube 14 are connected to a suitable source of electrical energy such that the former becomes an anode and the latter becomes a cathode. The system shown in FIGURE 1 is positioned in a uniform, low density atmosphere.

In practising a method embodying my invention, and utilizing the apparatus shown in FIGURE 1, a beam 16 of charged particles is directed from source 10 towards detector 12 in the direction shown by the arrow. This beam is intercepted by plate 11, and a fine narrow beam 16' emerges from the aperture in the plate and passes through tube 13. The geometry of the system is such that if the system were in a perfect vacuum, all the particles in beam 16' would pass directly through tube 13, and none would be detected, i.e., the count rate would be zero. This is another way of saying that detector 12 does not detect any unscattered particles. Since the system is in a uniform, low density atmosphere, some of the particles in beam 16' will be single scattered at an acute forward angle relative to the direction of the beam as a result of single collisions. The path of such a particle is shown at 17. Because tube 13 is long and narrow, single scattered particles have a good chance of hitting and penetrating the walls of tube 13. These single scattered particles are detected and counted by detector 12 in a known manner. The number of particles counted is proportional to gas density.

Generally speaking, if source 10 produces a beam of fast electrons, the scattering factor for the various permanent gases does not vary much, so that the number of counts can be related directly to gas density by suitable calibration of the gauge. If the source produces alpha particles, this may not be the case, and it may be necessary to know the composition of the atmosphere before gas density can be obtained. This will be referred to again at a later point in this description.

In principle any of the conventional particle detectors may be employed at detector 12, such as an ionization chamber, a proportional counter or a scintillation counter. The background count rate of a Geiger counter is particularly high, and it is not possible to discriminate against the background by pulse height discriminators. Anti-coincidence counters surrounding the Geiger counter could remedy the situation, but they are bulky. In order to overcome these problems, a scintillation detector may be employed. A very thin layer (to keep background counts low) of fluorescent material or other suitable scintillator covers tube 13. This layer is surrounded by a transparent medium which acts as a light pipe. The light pulses originating from the scintillation layer are counted by a photomultiplier tube at the end of the light pipe. Again this apparatus operates on the principle of single scattering of electrons, ions or alpha particles in a low density gas, together with a geometrical arrangement which allows an effective counting of the single scattered particles.

As aforementioned, while the use of a radioactive source 10 is most convenient, the available range of energies may not be sufficiently wide. Under such circumstances a thermionic cathode with an electron accelerating system may be used. In the range of densities of a single scattering gauge it is possible to accelerate and focus the electrons of a thermionic cathode without the need for any vacuum tube structure.

In the embodiment of my invention shown in FIGURE 2, I provide a source 10 of electrons, a focusing electrode 18, an anode 19, a pinhole aperture plate 11 and a detector 12. Anode 19, focusing electrode 18 and source 10 are connected to sources (not shown) of various potentials in a well known manner to provide an electron gun. Detector 12 comprises a light tight case 20 containing a scintillator 21 and a multiplier photo-tube 22. A mirror 23 is positioned on top of scintillator 21. A tube 24 passes through the detector. Case 20 is provided with a window 25. A film 26 of aluminum, for example, is evaporated onto one face of scintillator 21. As in the case of FIGURE 1, a beam of electrons 16 from source 10 passes through the aperture in plate 11 to provide a fine narrow beam 16'. When the system is in a perfect vacuum, no particles of beam 16' are scattered, and all pass through tube 24 and are undetected by detector 12. When the system is in a uniform, low density atmosphere, some of the particles will collide with gas molecules and will be single scattered at an acute forward angle relative to the direction of travel of the beam, as at 17. These particles enter the detector through window 25 and film 26, cause scintillations in scintillator 21, and are counted by photo-tube 22. The total forward scattering angle of apparatus embodying my invention (shown at A in FIGURE 2) is 30° or less.

The advantage of the embodiment of my invention shown in FIGURE 2 is that the scattered particles penetrate film 26 at an angle close to 90°, rather than at an angle of 1° or 2°, as in the case of the apparatus shown in FIGURE 1. This permits more low energy particles to be detected.

The sensitivity of the system shown in FIGURE 2 may be increased by increasing the path length L. The size of the detector need not be increased, as would be the case with the apparatus of FIGURE 1.

In the embodiments shown in both FIGURES 1 and 2 it may be necessary to shield the electrom beam to prevent deflection thereof by the earth's magnetic field, for example.

I have shown in FIGURE 3 an embodiment of my invention which may be baked and outgassed. Illustrated is a heavy walled metal tube 26 having a side tube 27 and a flange 28, the latter being adapted to be coupled to a vacuum system, the gas density in which is to be measured. Channels 29 and 30 are provided in the ends of tube 26 and are covered by thin metal foils 31 and 32 respectively welded to tube 26. Channels 29 and 30 are aligned with one another and are long and narrow in cross-section. A metal beam stop 33 is positioned in tube 26 between apertures 29 and 30. A radioactive particle source 10 is positioned adjacent aperture 29, while a detector 12 is positioned adjacent aperture 30.

It will be appreciated that the structure just described is a rigid, all metal body, and it is possible to heat this body to very high temperatures without causing structural or dimensional changes, even if it is connected to a vacuum system by means of flange 28. Hence this all-metal body can be baked and outgassed at high temperatures.

After outgassing, source 10 and detector 12 are located in the position shown. Source 10 directs a fan-shaped beam 16 of charged particles into tube 26. The middle part of this beam is caught by beam stop 33, thereby preventing radiation from passing directly from aperture 29 to aperture 30. Beam stop 33 forms two fan-shaped beams 16a and 16b. The geometry of the device is such that if there is a perfect vacuum in tube 26, no particles from the beam will enter aperture 30 and be detected by detector 12. This is so because there is no beam scattering due to collisions with gas molecules, and the beams 16a and 16b strike the walls of tube 26 beyond the point where they could be scattered into aperture 30 as a result of collision with the walls.

When low density gas is present in tube 26, some of the particles in the beams will be single scattered as at 17 as a result of collisions with gas molecules and will enter aperture 30 and be counted by detector 12. The number of counts registered indicates gas density.

Referring now to FIGURE 4, I have shown the nose part of the fuselage 40 of a satellite, rocket or the like. Projecting from the nose of the fuselage is a conical support 41 on which a gauge embodying my invention is mounted. This gauge comprises a radioactive source 42, say Kr-85, for example, contained in an annular channel 43 in a ring 44 which may be made of aluminum, for example. An aluminum foil 45 is brazed or welded to ring 44. Generally ring shaped beam stops 46, 47 and 48 which may be made of aluminum or magnesium, for example, are provided. Beam stops 46 and 47 define an annular channel or aperture 49 therebetween. Beam stop 48 is slidably mounted on beam stop 47 to permit fine adjustments. A carbon or beryllium liner 50 may be provided on beam stop 48 to minimize secondary gamma rays. A liner of similar material also may be placed in the source cavity. A heat shield 51 is positioned on support 41 as indicated and may be made of pyro-ceram, for example.

The reference numeral 52 indicates a detector. The detector comprises a ring 53 having an annular opening 54 therein which forms the detector chamber. Opening 54 is closed by an aluminum foil 55 welded to ring 53. A ring-shaped aperture plate 56 having a ring-shaped aperture 57 therein is positioned in front of ring 53. A probe or anode wire 58 extends into opening 54 and is connected to known circuitry to register counts.

The radiation cone 59 from source 42 is partially blocked by beam stop 48 and is directed generally towards detector 52. It will be noted, however, that the radiation cone 59 just misses the detector. A beam observation area is defined by the intersection of the radiation cone and the viewing angle of the detector. The viewing angle of the detector is determined by the width of aperture 57.

In the operation of the embodiment of my invention shown in FIGURE 4, the satellite or rocket is travelling through low density atmosphere. Because of the low density of the atmosphere at high altitudes, some of the particles in the beam observation area are single scattered (as at 17) into the detector and counted. Because the beam is directed so as not to strike the detector, only scattered particles from the beam are counted. As before, counts are related to gas density.

It will be appreciated that gauges embodying my invention will require calibration. In calibrating the gauges, they are operated in atmospheres having known densities, and a graph of density vs. counts made. Once this graph is available, one can determine unknown densities from it, when the number of counts is known. Depending on the type of particles employed and the geometry of the gauge, it may also be necessary to know gas composition before gas density can be determined.

The sensitivity of the gauge shown in FIGURE 4 may be increased by increasing the path length L which may be between 1 and 10 feet.

The gauges previously described in detail herein may be refined for measuring gas composition in addition to gas density. The procedure involved for doing this comprises (a) the use of a set of apertures defining the scattering angle $\theta$ to narrow limits, say $\theta = 3°\ 30' \pm 15'$, and (b) the use of a detector capable of measuring the residual energy of the particle hitting the detector after being scattered through the angle $\theta$.

Suppose alpha particles of uniform energy $E_o$ are scattered on, say, oxygen atoms of mass 16 or on argon atoms of mass 40. Any deflection angle may occur, but with the above mentioned aperture setting only alpha particles scattered by the angle $\theta$ will reach the detector. From elementary collision theory it will be evident that the recoil energy obtained in this $\theta$ collision by either the oxygen atom or the argon atom is substantially different. Since this recoil energy in each case has been lost by the alpha particle, the residual energy with which the alpha particle reaches the detector is different. The detector is able to discriminate between the two energies and, hence, between collision having occurred with oxygen and argon atoms.

Counting the number of oxygen collisions and argon collisions separately, the density of oxygen and of argon may be separately determined. This system can be used to detect gas compositions of more than two gases. The limit of the extension of the system is determined by the capability of the detector to discriminately detect particles of different energy.

Electrons or ion beams may be employed as well as alpha particles.

FIGURE 7 shows an embodiment of the above-mentioned system.

Collimators 100 of, say, one hundred small, parallel tubes of 1 mm. in diameter and 100 mm. long, are placed in front of a monoenergetic source 10 and a detector 12. The volume elements formed by the intersection of all the extensions of the tube channels are the collision areas from which scattered particles can reach the detector provided the deflection angle is $\theta$, and only $\theta$.

The embodiment of my invention shown in FIGURE 5 is very similar to that shown in FIGURE 4 and is adapted to measure Mach-number as well as gas density. In this embodiment a pair of supports 41 project from the nose of the fuselage of the rocket or satellite. Mounted between these supports and perpendicular to the direction of travel of the craft is an obstacle in the form of a rod 60. A source 42 of the type shown in FIGURE 4 is mounted on one support 41 at one end of rod 60, while a pair of separate detectors 52 are mounted on the other support 41 at the other end of the rod. The source emits a pair of beams of charged particles which just miss detectors 52. Single scattered particles from the beam observation area of one beam enter one detector and are counted, while single scattered particles from the beam observation area of the other beam enter the other detector and are counted separately. In this manner gas density before and after the rod is measured. The rod sets up detached shock waves as the craft travels on its course, and these shock waves affect gas density. The density ratio given by the two gauges will be a function of the Mach-number.

This device would require calibration, of course. If the gauge which is in front of rod 60 is in an area undisturbed by shock wagves, the counts of this gauge may be used to determine gas density.

If desired, rod 60 may be eliminated and two separate sources 42 and detectors 52 provided on supports 41 as shown schematically in FIGURE 6. The craft 40 is travelling in the direction shown by the arrow and sets up shock waves, as indicated at 70. The gauge nearest the fuselage reads gas density in the shock wave region. The other gauge is not in the shock wave region and reads undisturbed gas density. The reading of this latter gauge is a measure of gas density, while the ratio of the readings of the two gauges is a measure of the relative speed between the craft and the atmosphere.

On review it will be seen that all embodiments of my invention are characterized by a source of charged particles which is adapted to direct a beam, preferably of fast electrons, at least generally towards a detector and beyond a beam observation area, along a path through an at least substantially uniform low density atmosphere. The source and detector are spaced apart on a longitudinal axis coincident with or at a slight acute angle relative to the axis of the beam. The geometry of all embodiments of my invention is such that, and means are provided such that particles which are not scattered from the beam remain undetected by the detector. In other words, in a vacuum the detector registers no counts. Particles in the beam observation area of the beam of charged particles are single scattered by collision with gas molecules, and these single scattered particles are detected and counted by the detector. The number of counts is proportional to gas density which may be read directly from the calibration curve of the gauge.

Thus, in practising my invention, the following steps are taken: directing a beam of charged particles along a path through an atmosphere of at least substantially uniform density from a source at least generally towards a detector and beyond a beam observation area, preventing unscattered ones of the charged particles from being detected by the detector, detecting and counting the single scattered particles scattered from the beam at the beam observation area at an acute forward angle relative to the direction of travel of the beam, and relating the number of single scattered particles counted to atmospheric density.

In order to gauge Mach-number of a craft passing through a low density atmosphere as well as gas density, the aforementioned procedure is followed in regions where shock waves exist and where no shock waves exist. The ratio of the two gas densities obtained in the two regions is related to Mach-number.

It will be appreciated that various changes and modifications of my invention may be made without departing from the spirit and scope thereof as defined in the appended claims.

What I claim as my invention is:

1. A method for measuring the density of low density atmospheres which comprises, directing a beam of charged particles along a path through an atmosphere of at least substantially uniform density from a source at least generally towards a detector and beyond a beam observation area, preventing unscattered ones of said charged particles from being detected by said detector, detecting and counting single scattered particles scattered from said beam at said beam observation area at an acute forward angle relative to the direction of travel of said beam, and relating the number of single scattered particles counted to atmospheric density.

2. A method for measuring the density of low density atmospheres which comprises, directing a beam of charged particles along a path through an atmosphere of at least substantially uniform density from a source towards a detector and beyond a beam observation area, preventing unscattered ones of said charged particles from being detected by said detector by passing said unscattered one of said charged particles through an aperture passing through said detector, detecting and counting single scattered particles scattered from said beam at said beam observation area at an acute forward angle relative to the direction of travel of said beam, and relating the number of single scattered particles counted to atmospheric density.

3. A method for measuring the density of low density atmospheres which comprises, directing a beam of charged particles along a path through an atmosphere of at least substantially uniform density from a source at least generally towards a detector and beyond a beam observation area, preventing unscattered ones of said charged particles from being detected by said detector by intercepting a portion of said beam of charged particles between said source and said beam observation area, detecting and counting single scattered particles scattered from said beam at said beam observation area at an acute forward angle relative to the direction of travel of said beam, and relating the number of single scattered particles counted to atmospheric density.

4. A method for measuring the density of the low density atmosphere of the earth at high altitudes which comprises, directing a beam of charged particles along a path through a portion of said atmosphere having at least substantially uniform density from a source at least generally towards a detector and beyond a beam observation area, preventing unscattered ones of said charged particles from being detected by said detector, detecting and counting single scattered particles scattered from said beam at said beam observation area at an acute forward angle relative to the direction of travel of said beam, and relating the number of single scattered particles counted to atmospheric density.

5. A method according to claim 1 wherein said detector is a discriminating detector and including the step of measuring with said discriminating detector the residual energy of said single scattered particles so counted.

6. A method for measuring the density and gas composition of low density atmospheres which comprises directing a beam of monoenergetic charged particles from a source through a collimator and along a path through an atmosphere of at least substantially uniform density at least generally towards a discriminating detector and beyond a beam observation area, preventing unscattered ones of said charged particles from being detected by said detector by permitting only single scattered particles from said beam observation area scattered at an angle $\theta$ to said beam to pass through a collimator inclined at said angle $\theta$ to said beam and strike said detector, detecting and counting said single scattered particles with said detector, relating the number of said single scattered particles so counted to atmospheric density, measuring with said detector the residual energy of said single scattered particles so counted, and determining gas composition from the latter energy measurement.

7. A method for measuring the density of low density atmospheres and the speed of a craft passing therethrough which comprises directing a beam of charged particles along an undisturbed path at the front of said craft through an atmosphere of at least substantially uniform density from a source at least generally towards a detector and beyond a beam observation area, preventing unscattered ones of said charged particles from being detected by said detector, detecting and counting single scattered particles scattered from said beam at said beam observation area at an acute forward angle relative to the direction of travel of said beam, relating the number of single scattered particles counted to atmospheric density, directing a second beam of charged particles along a path in the region of shock waves at the front of said craft from a source at least generally towards a detector and beyond a beam observation area, preventing unscattered ones of the charged particles from being detected by the detector, detecting and counting single scattered particles scattered from the beam at the beam observation area at an acute forward angle relative to the direction of travel of the beam, and determining the speed of the craft from the numbers of single scattered particles counted from the first and second beams.

References Cited by the Examiner
UNITED STATES PATENTS

| | | | |
|---|---|---|---|
| 2,744,697 | 5/56 | Van Allen | 250—83.6 |
| 2,903,590 | 9/59 | Somerville | 250—83.3 |
| 2,908,819 | 10/59 | Marx | 250—43.5 |
| 2,976,677 | 3/61 | Taylor | 250—43.5 |

OTHER REFERENCES

Applied Radiation-Beta Backscatter Measures Altitude, Nucleonics, volume 18, No. 3, March 1960, page 124.

RALPH G. NILSON, *Primary Examiner*.

ARTHUR GAUSS, *Examiner*.